April 8, 1958 H. G. TASKER ET AL 2,830,152
SWITCH MEANS AND METHOD OF FABRICATING SAME
Filed June 27, 1955 6 Sheets-Sheet 1

HOMER G. TASKER
EUGENE H. IRASEK
INVENTORS

BY
ATTORNEY

April 8, 1958     H. G. TASKER ET AL     2,830,152
SWITCH MEANS AND METHOD OF FABRICATING SAME
Filed June 27, 1955     6 Sheets-Sheet 2

HOMER G. TASKER
EUGENE H. IRASEK
INVENTORS

BY
ATTORNEY

HOMER G. TASKER
EUGENE H. IRASEK
INVENTORS

BY
ATTORNEY

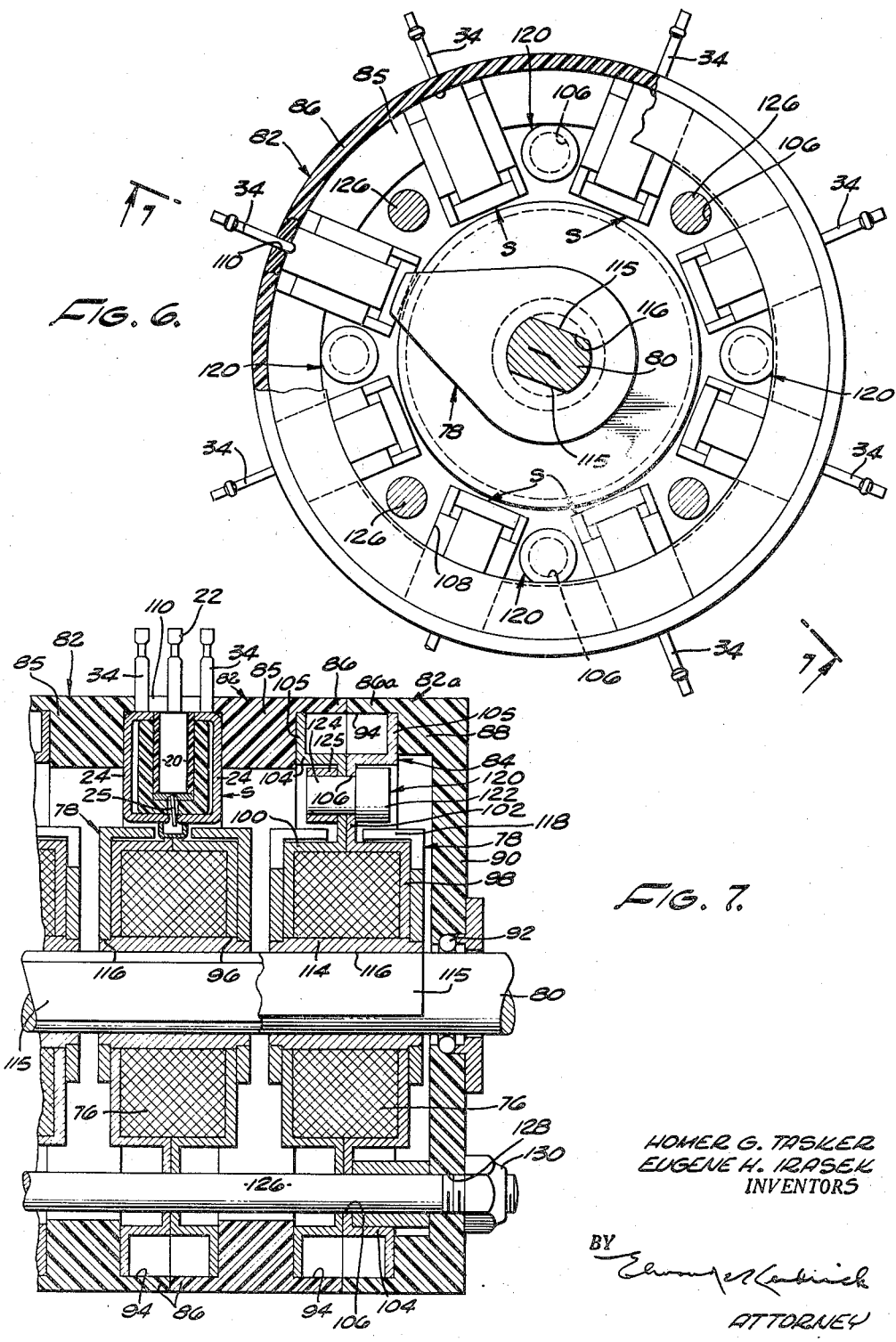

HOMER G. TASKER
EUGENE H. IRASEK
INVENTORS

ATTORNEY

April 8, 1958    H. G. TASKER ET AL    2,830,152
SWITCH MEANS AND METHOD OF FABRICATING SAME
Filed June 27, 1955    6 Sheets-Sheet 6

HOMER G. TASKER
EUGENE H. IRASEK
INVENTORS

BY
ATTORNEY

_United States Patent Office_

2,830,152
Patented Apr. 8, 1958

2,830,152

SWITCH MEANS AND METHOD OF FABRICATING SAME

Homer G. Tasker, Sherman Oaks, and Eugene H. Irasek, Los Angeles, Calif., assignors to Gilfillan Bros. Inc., Los Angeles, Calif., a corporation of California Application June 27, 1955, Serial No. 518,076

16 Claims. (Cl. 200—93)

This invention relates to switching devices including switches, relays and the like in which the switching action is carried out under remote control by magnetic force. In general, the invention pertains to the type of switch unit which comprises a permanent magnet for connection to a circuit terminal, a pair of opposite flux-concentrating members in the field of force of the magnet for connection to two corresponding circuit terminals, and a polarized armature mounted at one pole of the magnet to function as a switch member for selective contact with the two flux-concentrating members in response to a superimposed control flux.

The two flux-concentrating members may be of substantially equal effectiveness to make the switch unit bistable or one of the two may be curtailed to be effective for holding the movable armature only when the control flux is applied. The control flux may be applied to a plurality of such units selectively or a relay construction may be used in which at least one of such switch units is fixed in the field of force of a coil that may be energized at will to create the control flux.

An important object of the invention is to provide an exceedingly compact structural organization that will facilitate the fabrication of such a switch unit in exceedingly small sizes. The initial embodiment of the switch unit, for example, occupies a space of less than 1/100 of a cubic inch. A further object is to provide a simplified construction and a simple method of fabrication suitable for mass production of the switch units at relatively low cost and with close dimensional accuracy.

These objects are attained largely by mounting the various components of a switch unit in and on a central mass of non-conducting material. In the preferred practice of the invention the central mass is an accurately molded body of plastic material that is hollow to house the permanent magnet. The two members that concentrate the polarizing flux of the permanent magnet are simply mounted on the opposite outer sides of this body with a gap between the two members to receive the polarized armature.

A feature of the invention is the shaping of the molded body to serve as means for correctly positioning the two flux-concentrating members relative to the permanent magnet and relative to each other with an accurately predetermined gap between the two members. For this purpose, the molded body has at least one projection to serve as a spacer between the two flux-concentrating members, so that correct spacing may be attained by simply abutting portions of the ends of the two flux-concentrating members against the opposite sides of such a projection, other portions of the two ends being left exposed for cooperation with the armature.

In the preferred practice of the invention the central plastic body is further formed with external shoulders to abut the sides of the two flux-concentrating members. These shoulders cooperate with the spacer projection or projections for completely predetermining the positions of the two flux-concentrating members. Thus, the central plastic body not only serves its primary structural purpose in the completed switch unit as support means or supporting core for the rest of the components of the unit, but also serves, in effect, as a jig to simplify the fabrication of the unit. In one simple practice of the invention, the fabrication procedure consists simply in anchoring the permanent magnet inside the hollow body, bonding the two flux-concentrating members to the body and dropping the armature into place in the gap between the flux-concentrating members. In another simple practice of the invention a suitable protecting and insulating jacket encircles the plastic body as well as the two flux-concentrating members to hold the flux-concentrating members in their assembled positions and additionally to retain the permanent magnet in its enclosed position.

Another object of the invention is to provide a multiple-switch combination or assembly in which a plurality of such switch units is incorporated. Here again an object of the invention is to provide a relatively simple compact construction and a method of fabrication suitable for economical mass production with hgih dimensional accuracy.

In general, this further object is attained by what may be termed a stack construction in which a casing for the multiple switch assembly is formed by a series of casing sections positioned end-to-end with intervening transverse members interlocked therewith. The interlocked transverse members cooperate to provide interior pockets to hold the plurality of switch units and also cooperate to hold coils in position for generating control flux for the units. The procedure for fabricating such an assembly consists essentially of stacking the component parts in sequence and then interconnecting the parts to unify the assembly. In this respect, one feature of the invention is the concept of unifying the assembly simply by tying together the two opposite end components of the stack. In one practice of the invention another feature in the use of flux-shorting elements for this purpose.

As a multiple switch assembly, the invention has special utility in the form of a rotary cyclic device or selector relay for storing data. As will be explained, the invention may be embodied, for example, in a digital-type, ground-to-air data link for use on aircraft and further objects of the invention relate to such a device.

The various objects, features and advantages of the invention will be apparent in the following detailed description considered with the accompanying drawings.

In the drawings, which are to be regarded as merely illustrative:

Fig. 7 is a fragmentary section taken as indicated by the broken line 7—7 of Fig. 6;

Fig. 8 is an exploded perspective view of a portion of the interlocking structure of the multiple switch device;

Construction of the switch unit

Figure 1:
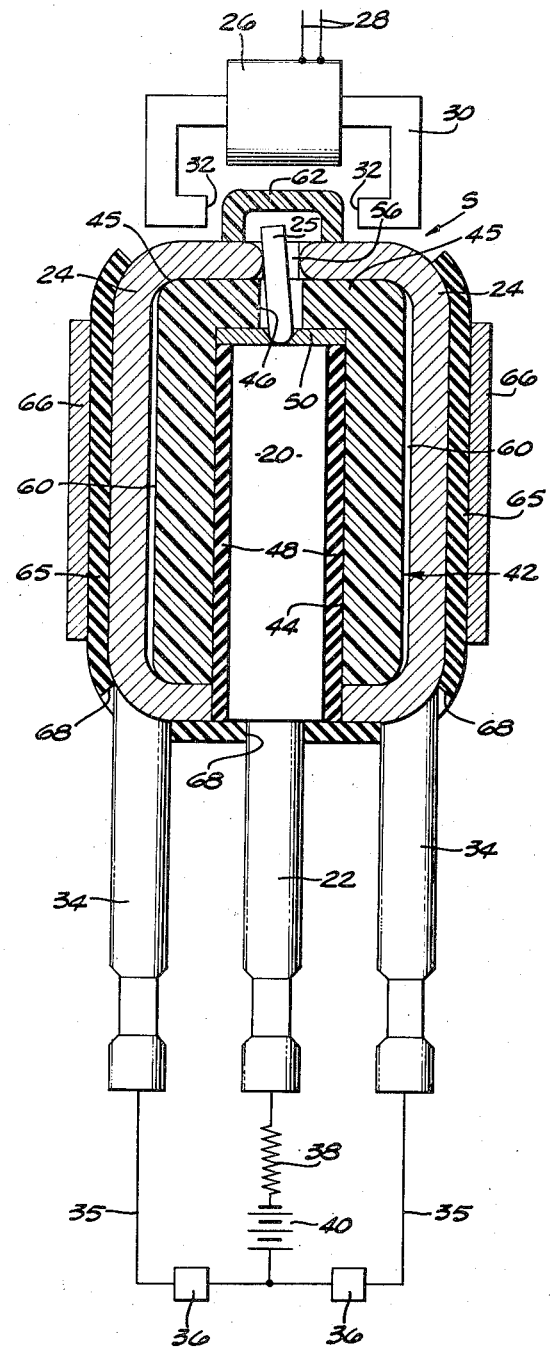
Fig. 1 is a sectional view on an enlarged scale of the presently preferred embodiment of the switch unit.
Figure 2:
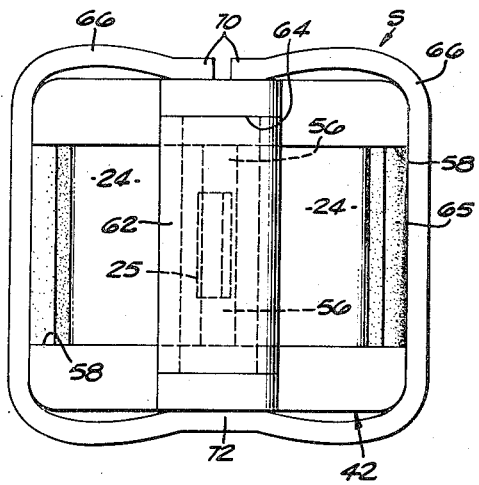
Fig. 2 is a top plan view of the switch unit.
Figure 3:
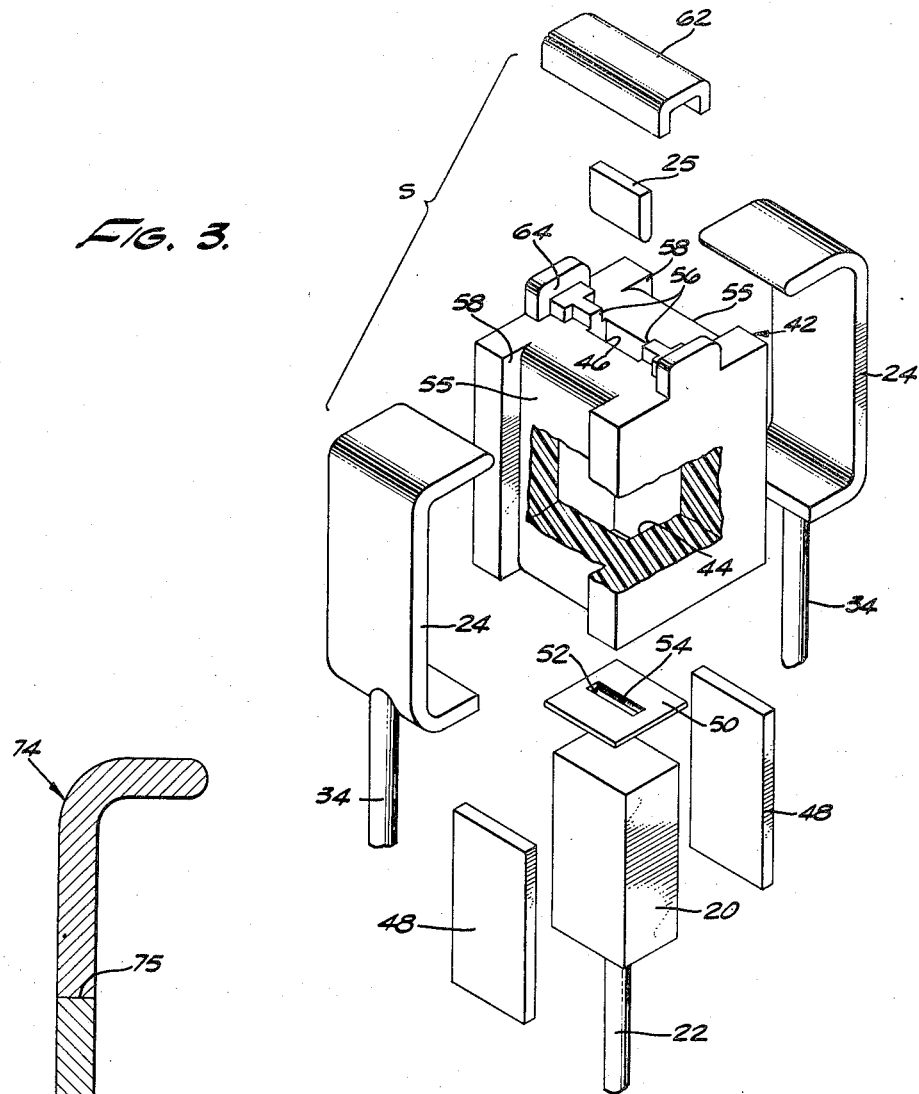
Fig. 3 is an exploded perspective view of the basic components of the switch unit.

In Figs. 1 to 3 illustrating the presently preferred embodiment of the switch unit, the principal working parts are a permanent magnet 20 having a terminal extension 22 for connection to an electric circuit, a pair of U-shaped flux-concentrating members 24 in the field of force of the permanent magnet, and an armature 25 that is mounted at one end of the permanent magnet in the gap between the two flux-concentrating members 24. The armature 25 is in contact with the end or pole face of the permament magnet 20 to be polarized by the permanent magnet and to function as a switch arm for contact with the two flux-concentrating members 24 alternately. The described switch unit is bi-stable since the polarized armature 25 will remain in either of its two positions in contact with the respective flux-concentrating members 24.

The position of the armature 25 may be changed from contact with one of the flux-concentrating members 24 to contact with the other flux-concentrating member by superimposing an appropriately polarized magnetic control flux. For this purpose Fig. 1 shows diagrammatically a coil 26 connected to a pair of wires 28 by means of which it may be energized by remote control for current flow in either direction through the coil. The coil 26 is mounted on a U-shaped core 30 which may be termed a control-flux concentrator. The control-flux concentrator 30 has a pair of inwardly turned ends or poles 32 which may be positioned to straddle the general region of the armature 25 shown in Fig. 1. When the control-flux concentrator 30 is in this position the coil 26 may be energized by current flow in either direction to cause the polarized armature 25 to swing in either direction. When coil 26 is subsequently deenergized the armature will remain in whichever position it is placed.

A number of the switch units such as shown in Fig. 1 may be placed in a row and the control-flux concentrator 30 may be moved along the row for selective operation of the individual switch units.

Each of the flux-concentrating members 24 has a corresponding terminal extension 34 for connection with an electric circuit. As shown diagrammatically in Fig. 1 the two terminal extensions 34 may be connected by wires 35 with corresponding electrically responsive devices 36, which devices, for example, may be signal lamps. The terminal extension 22 of the permanent magnet 20 is connected through a resistor 38 with a voltage source such as a battery 40 and the second side of the battery is connected to the two devices 36. Thus, the two devices 36 may be energized alternately as desired by applying selectively polarized control flux to the armature by means of the control-flux concentrator 30.

The switch unit S may be of various constructions and may be fabricated by various procedures in various practices of the invention. Preferably, however, the construction includes a central structural core in the form of a mass of non-conducting material to which the various components are assembled. For this purpose, the core may comprise a body 42 of suitable plastic material, which body may be molded on a mass production basis with close accuracy. The plastic body 42 is hollow, being formed with a chamber 44 that is open at one end and at the other end has an end wall 45 with an opening 46 therein to clear the armature 25.

The permanent magnet 20 may be rectangular in cross-sectional configuration as shown in Fig. 3 and the chamber 44 may be of similar cross-sectional configuration to house the magnet. Since the lower end of the body of the magnet 20 must be electrically insulated from the two flux-concentrating members 24, a pair of strips 48 of suitable insulating material may be placed in the chamber 44 on opposite sides of the magnet, each strip extending to the lower end of the magnet body.

It is also desirable to place a suitable retaining member 50 between the permanent magnet and the end wall 45 to confine the inner end of the armature 25 to a central portion of the end surface or pole face of the permanent magnet. The retaining member 50 may be made of non-magnetic material such as brass and may be formed with a slot 52 having beveled side walls 54.

The molded plastic body 42 is formed with at least one external projection in the region of the opening 46 in the end wall 45 to serve as spacer means for the two flux-concentrating members 24. It is also desirable to form the molded body 42 with external shoulders for abutment against the sides of the flux-concentrating members 24 to cooperate with the one or more projections for predetermining the exact positions of the two flux responsive members 24. In the particular construction shown in the drawings, the plastic body 42 is molded with a groove 55 that extends across the bottom of the body up the two sides and over the top, this groove being of a width for snug fit of the flux-concentrating members 24 therein. A pair of projections 56 extend into the groove 55 in the region of the end wall opening 46, the two projections terminating at the end wall opening. In their assembled positions, the two flux-concentrating members 24 abut the two projections 56 in close contact therewith and the two sides of each of the flux-concentrating members abut the pairs of shoulders or side walls 58 of the groove. The lower ends of the flux-concentrating members 24 abut the corresponding insulating strips 48 on opposite sides of the permanent magnet.

It is contemplated that the groove 55 will be sufficiently deep on the two opposite sides of the molded body 42 to provide a clearance space 60 along the intermediate portion of each of the flux-concentrating members to provide complete freedom for the two ends of the flux-concentrating members to contact the projections 56 at one end and the insulating strips 48 at the other end. Thus, if the two flux-concentrating members 24 are pressed inward from opposite sides, the pressure will be divided between the projections 56 at one end and the insulating strips 48 at the other end, and the precise spacing of the two poles of the flux-concentrating members 24 in the region of the end wall opening 46 will be determined by the thickness of the two projections 56.

Figure 1A:
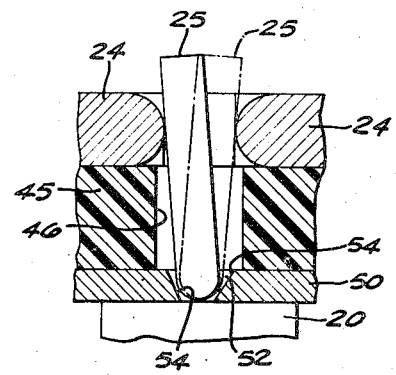
Fig. 1a is an enlarged portion of Fig. 1 showing the action of the polarized armature.

The armature 25 which may be made of suitable low carbon steel is preferably a thin rectangular member as shown in Fig. 3 dimensioned for a free swinging movement in the end wall opening 45. Preferably the lower edge of the armature is cylindrically rounded for rolling contact with the pole surface of the permanent magnet 20, the two beveled side walls 54 of the retaining member 50 being spaced apart to confine the lower end of the armature to the central area of the pole face, the spacing being sufficient to accommodate the rolling movement of the lower end of the armature. Preferably the two ends or poles of the flux-concentrating members 24 are slightly rounded as best shown in Fig. 1a for line contact with the armature. It is to be noted that these two ends of the flux-concentrating members slightly overhang the end wall opening 46 so that the material of the molded body 42 does not interfere with the movements of the armature.

It has been found that shaping the inner end of the armature for rolling movement and shaping the ends of the flux-concentrating members 24 for line contact with the armature results in smooth operation of the armature at high speed with no tendency for the inner end of the armature to slide on the end surface of the permanent magnet. It has been further found that such an arrangement minimizes any tendency for the armature to rebound or flutter when it is thrown by magnetic force from contact with one flux-concentrating member into contact with the other.

Preferably an arched cover member 62 of non-magnetic material is added to enclose the outer end of the armature 25. The plastic body 42 may be formed with shoulders 64 to abut the opposite ends of the cover member 62. One advantage to this construction is that it is possible to seal off the space in which the armature 25 is confined and, if necessary, this space may be placed under a vacuum or may be filled with a suitable gas. The sealing may be accomplished by use of a suitable bonding medium around the edges of the cover member 62, around the ends of the flux-concentrating members 24, and at the surfaces of the retaining member 50.

It is apparent from the foregoing description and from Fig. 3 that it is a simple matter to assemble the switch unit S even though the completed unit may be so small that the maximum dimension is on the order of ¼ inch or smaller. The method of fabrication consists simply of placing the basic components of the switch unit in position in and on the plastic body 24.

With the plastic body turned upside down, it is a simple matter to drop the retaining member 50 into position against the end wall 45 and to insert the body of the permanent magnet 20 into the chamber 44 together with the two insulating strips 48 on the opposite sides of the permanent magnet. Preferably a suitable cement or other bonding material is used to anchor the permanent magnet in position, the magnet being bonded to the retaining member 50 and the retaining member being bonded to the end wall 45.

The two flux-concentrating members 24 may then be positioned in the groove 55 and suitably cemented in position with the upper ends of the flux-concentrating members abutting the projections 56 and the lower ends pressing the insulating strips 48 against the body of the permanent magnet 20. The armature 25 may then be dropped into position to complete a fully operative switch unit. Any suitable adhesive bonding agent may be used to permanently retain the magnet 20 and the two flux-concentrating members 24 in their assembled position. A bonding agent may also be used to anchor the cover member 62 in position and to completely seal off the space confining the armature 25 if a sealed construction is desired. No further structure is required unless it is desired to encase the switch unit for protection and/or to cover the flux-concentrating members 24 in an insulating manner.

If it is desirable to encase the unit in a suitable jacket, this purpose may be accomplished by means of a flexible ribbon 65 of suitable insulating material in combination with a split metal band 66. The flexible ribbon 65 is of a width to cover the exposed surfaces of the flux-concentrating members 24 and is formed with three spaced apertures 68 to clear the three terminal extensions 22 and 34. The split metal band 66 may be made of brass, for example, and is dimensioned to embrace the switch unit including the ribbon 65 in a resilient manner.

The two ends 70 of the split band may be offset inwardly as shown in Fig. 2 and the opposite intermediate portion of the split band may be offset inwardly as indicated at 72 so that the metal band functions as a spring exerting pressure to urge the two flux-concentrating members 24 toward each other. Thus the split metal band 66 holds the two flux-concentrating members 24 in pressure contact against the projections 56 and in doing so anchors the insulating ribbon 65 against the plastic body 42 with the intermediate portion of the ribbon in abutment against the bottom end of the body of the permanent magnet 20.

It is apparent that the insulating ribbon 65 may serve the purpose of holding the permanent magnet 20 in its assembled position with the split metal band, in turn, serving the purpose of holding the ribbon in position. Thus in one practice of the invention employing an encasing jacket of the character described the switch unit may be assembled quickly and easily simply by placing the various parts in their assembled positions in sequence without employing any special tools, without employing any bonding medium, and without resort to special fastening devices such as rivets, screws, pins and the like.

As heretofore stated, the switch unit shown in Figs. 1 to 3 is a bi-stable device since the armature 25 will remain in a stable manner at either of its two positions to which it may be shifted by the application of the control flux. A uni-stable switch unit may be provided simply by substituting a flux-concentrating member such as shown in Fig. 4 for one of the two previously described flux-concentrating members.

Figure 4:
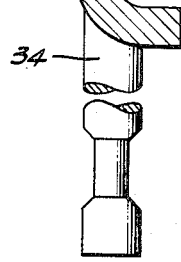
Fig. 4 is a view partly in side elevation and partly in section showing a flux-concentrating member that may be substituted for one of the flux-concentrating members in Fig. 1 to make the switch unit uni-stable instead of bistable.
Figure 5:
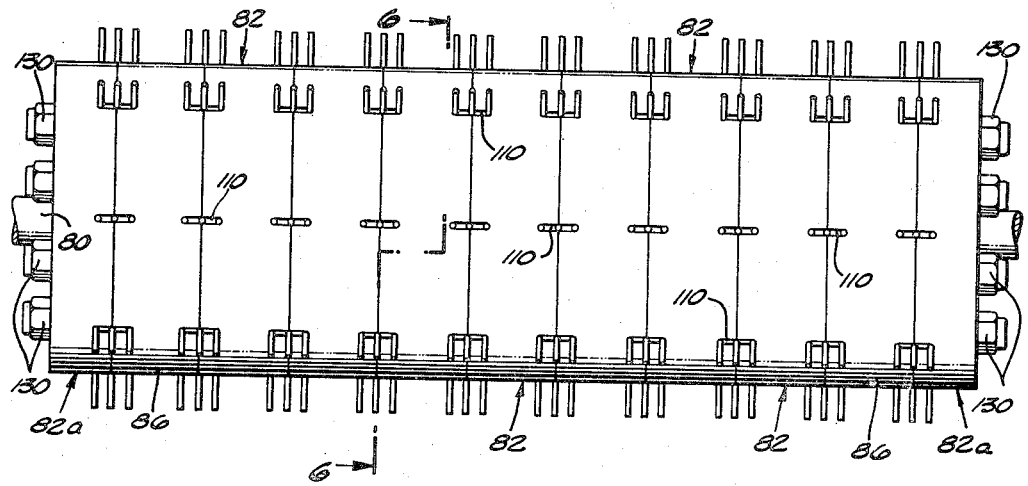
Fig. 5 is a side elevation of a multiple switch device incorporating a plurality of the switch units.
Figure 6:
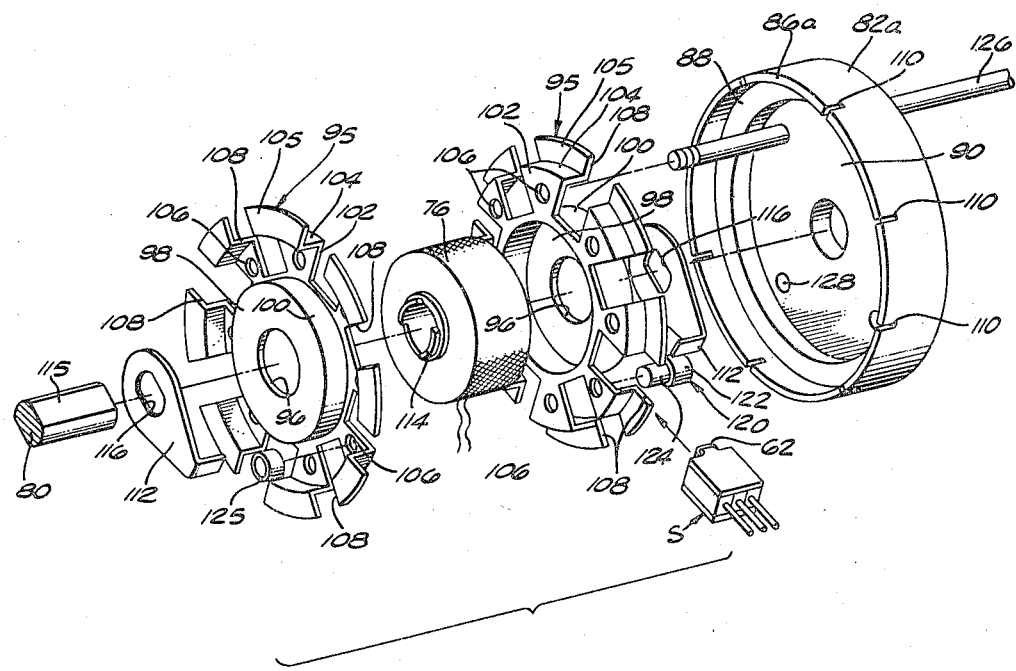
Fig. 6 is a transverse sectional view of the same multiple switch device.

The flux-concentrating member 74 in Fig. 4 is of the same general configuration as heretofore described and is formed with the usual terminal extension 34. In this instance, however, only the upper portion of the flux-concentrating member above the dividing line 75 is made of magnetic material, the lower portion below the dividing line being made of non-magnetic material such as brass. With the flux-concentrating portion of the member curtailed in this manner the armature 25 will remain in contact with the flux-concentrating member 74 only so long as it is forced to do so by superimposed control flux. When the control flux is removed, the armature will swing away from the flux-concentrating member 74 to its alternate position.

Figs. 5 to 8 show how a multiple switch assembly of the rotary type may incorporate a plurality of the switch units S with the switch units arranged in ten circumferential rows of eight switch units each. Associated with each circumferential row is a coil 76 for generating control flux and an associated control-flux concentrator 78 for applying the control flux in an operative manner to the switch units successively. All of the control-flux concentrators 78 are mounted on a control shaft 80 in longitudinal alignment so that the ten control-flux concentrators register with ten corresponding switch units S eight times in the course of each rotation of the shaft. In this instance it is assumed that all of the control units S are bi-stable units but some or all may be uni-stable units if desired.

It is apparent that such a multiple switch assembly may be constructed in various ways. In this regard a feature of the construction shown in the drawings is that the working parts of the assembly are supported by a stack of casing sections 82 and a plurality of transverse means interlocked therewith in a stack assembly, each of the transverse means being generally designated by numeral 84. In the complete assembly there are eleven casing sections 82 including two end casing sections 82a and there are ten transverse means 84 alternating with the casing sections.

Each of the casing sections 82 comprises a ring-shaped body 85 with two opposite cylindrical flanges 86 integral therewith. Each of the two end casing sections 82a comprises a similar ring-shaped body 88 that is integral with an end wall 90 and that has a single cylindrical flange 86a. The series of casing sections 82 and 82a are stacked end-to-end to form a complete casing in which the control shaft 80 may be journaled suitable bearings 92 in the end walls 90. Each of the casing sections 82 and 82a may be described as internally recessed since each pair of contiguous casing sections forms an internal circumferential recess or groove 94 for interlocking engagement with the series of transverse means 84.

Each of the transverse means 84 that interlocks with an internal casing groove 94 serves as means to mount a corresponding electrical coil 76 and also cooperates with the casing sections to form pockets for enclosing and retaining the individual switch units S. Preferably each of the transverse means 84 is made in two separate parts for at least partially enclosing a coil 76 from opposite sides. In this regard, a feature of the present embodiment of the invention is that each of the transverse means 84 comprises two identical transverse wall members 95 positioned face-to-face, the wall members being made of non-magnetic material such as aluminum.

Each of the transverse wall members 95 has a central circular aperture 96 to clear the control shaft 80 and is offset to form a concentric cup-shaped recess conforming to the configuration of a coil 76. The cup-shaped portion of each transverse wall member comprises a radial web 98 and a circumferential wall portion 100. Thus the two cup-shaped portions of a pair of transverse wall members 95 combine to form an annular chamber to house the corresponding coil 76.

Each of the transverse wall members 95 is further formed with an intermediate radial web 102 and is offset circumferentially to form a second cylindrical wall portion 104 and an outer marginal web 105. The intermediate radial webs 102 of a pair of the transverse wall members 95 abut face-to-face and preferably are mechanically interconnected by suitable fastening means. For this purpose each of the transverse wall members 95 may have eight apertures 106 in its intermediate radial web 102, the eight apertures being in circular alignment with the corresponding eight switch units S and alternating in position therewith. The outer marginal webs 105 of a pair of the transverse wall members are spaced and dimensioned for snug fit with the corresponding internal groove 94 formed by the stack of casing sections 82 and 82a, as may be seen in Fig. 7.

Each of the transverse wall members 95 has eight peripheral recesses 108 cut therein to conform to the switch units S, each of the peripheral recesses cutting through the peripheral web 95, the cylindrical portion 94 and the intermediate radial web 102 of the transverse member. These peripheral recesses 108 cooperate with the casing recesses or internal grooves 94 to form individual pockets for the switch units S. The three terminal extensions 22 and 34 of each of the switch units S extends radially outward to the exterior through suitable slots 110 formed in the stack of casing sections 82 and 82a.

Each of the switch units S may be of the previously described construction with the insulating ribbon 65 and the split metal band 66 omitted, the two flux-concentrating members 24 being suitably bonded to the plastic body 42 of the switch unit. As shown in Fig. 7 each switch unit S fits snugly into an internal groove 94 of the casing with the cover member 62 of the switch unit in abutment with the inner edges of the peripheral recesses 108 of the corresponding pair of transverse wall members 95.

Each of the control-flux concentrators 78 is made of suitable magnetic material and may comprise two radial arms 112 united by an intervening sleeve 114, this assembly being suitably keyed to the control shaft 80. For this purpose the control shaft may be cut away to form flat longitudinal faces 115 and the two radial arms 112 may have corresponding non-circular apertures 116 to fit the shaft. The sleeve 114 clears the central apertures 96 of the corresponding pair of transverse wall members 95 and the radial arms 112 extend along opposite sides of the pair of transverse wall members. Each of the radial arms 112 is of angular cross-sectional configuration with end portions or poles 18 thereof forming a flux gap close to the circumferential row of switch units S as may be seen in Fig. 7.

While any suitable provision may be made for mechanically uniting the transverse wall members 95 of each pair of wall members and for unifying the stack of casing sections 82 and 82a together with the transverse wall members, a feature of the present embodiment of the invention is the use of what may be termed flux-shorting elements for this purpose. Four of the eight apertures 106 of each pair of transverse wall members 95 receive four corresponding fastening elements 120 of magnetic material. Each fastening element 120 may be made of mild steel and may have a head 122 and a shank 124 with a retaining ring 125 mounted on the shank with a forced fit. Four longitudinal tie rods 126 extend through the remaining four apertures 106 of each transverse wall member 95 for the purpose of unifying the entire assembly. Each tie rod 126, which may be made of mild steel, extends through corresponding apertures 128 in the casing end walls 90 at opposite ends of the assembly and is threaded at its two ends to receive suitable nuts 130 that engage the end walls to unify the assembly.

The manner in which the described multiple switch assembly serves its purpose may be readily understood from the foregoing description. In one mode of operation, for example, the control shaft 80 may be rotated in one rotary direction either continuously or intermittently with a pause at each of the eight longitudinal rows of ten switch units S each. When the aligned ten control-flux concentrators 78 register with a longitudinal row of ten corresponding switch units S, the corresponding ten coils 76 associated with the control-flux concentrators may be energized to operate the ten switch units, the direction of current flow through each of the coils being in accord with the desired position of the armature of the corresponding switch unit.

It is apparent that the eighty switch units may store eighty bits of data. For the purpose of binary numeration the multiple switch assembly may store either ten binary numerals of eight digits each or eight binary numerals of ten digits each. Since the individual switch units are of a size substantially less than 1/100 of a cubic inch, the multiple switch assembly may be a miniature device of lightweight construction and, of course, as many circumferential rows of switch units S may be incorporated in such a unit as required for any particular purpose.

When the multiple switch assembly is used as an airborne digital-type, ground-to-air data link decoder, for example, the control shaft 80 is driven by a suitable drive mechanism that is controlled by synchronizing pulses. Such a data link may be used for automatic ground-controlled approach (GCA) and also for return-to-base, intercept, etc.

Figure 10:
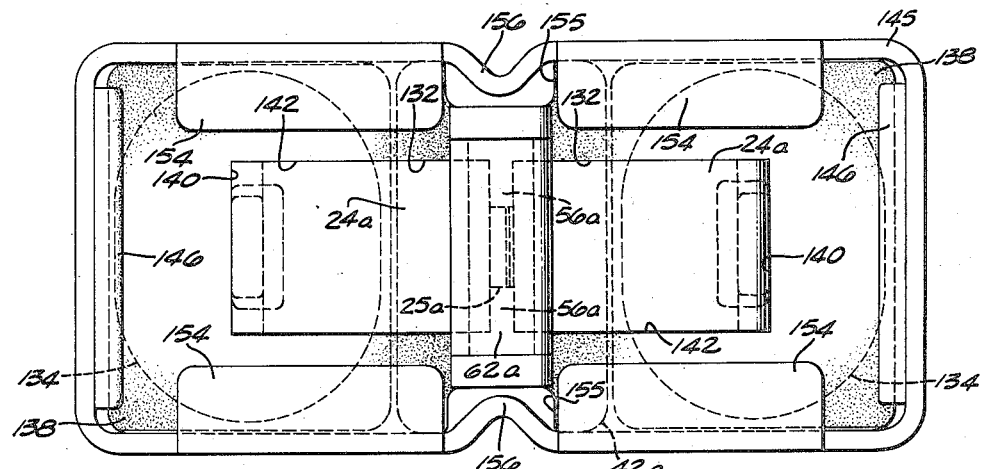
Fig. 10 is a top plan view of the relay shown in Fig. 11.
Figure 9:
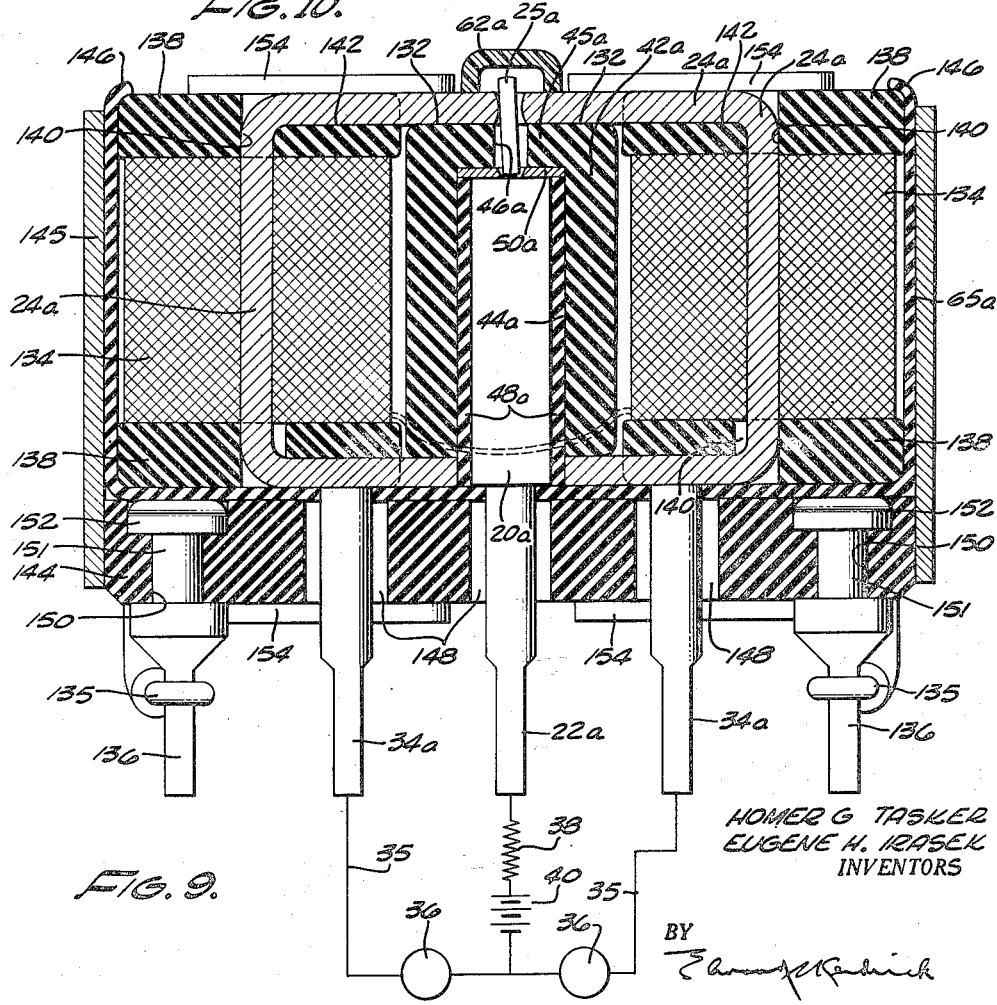
Fig. 9 is a sectional view of a relay incorporating the principles of the invention.

Figs. 9 and 10 illustrating another embodiment of the invention show a relay unit which is of general similarity to the previously described switch units S, as indicated by the use of corresponding numerals to indicate corresponding parts. Thus the components of the relay are assembled around a central plastic body 42a which has the usual chamber 44a and end wall 45a with an opening 46a therein. A permanent magnet 20a with a terminal extension 22a is mounted in the chamber 44a between a pair of insulating strips 48a and in abutment against a retaining member 50a.

As shown in dotted lines in Fig. 10, the plastic body 42a of the relay unit has a pair of aligned grooves 132 at each end to seat a pair of U-shaped flux-concentrating members 24a and the upper ends of these flux-concentrating members abut a pair of projections 56a inside a cover member 62a, the two projections being in the general region of the end wall opening 46a. The usual armature 25a is positioned in the end wall opening 46a in contact with the pole surface of the permanent magnet 20a.

Each of the flux-concentrating members 24a is surrounded by a corresponding coil 134, the two coils being oppositely wound but connected in series and each being connected by a corresponding conductor 135 with a corresponding terminal member 136. Each of the coils 134 is wound on the mid-portion of the corresponding flux-concentrating member 24a between a pair of suitable end plates 138 which may be made of suitable plastic material. Each of the end plates 138 has an aperture 140 and an adjoining groove 142 to receive the flux-concentrating member.

The component parts of the relay unit described to this point may be assembled together in the same general manner as heretofore described with the various contiguous fixed parts suitably bonded together to unify the assembly. If desired, however, additional casing structure may be added. In the present embodiment of the invention the casing, which may be termed a jacket, includes a plastic ribbon 65a, a base plate 144 of non-conducting material and a rectangular metal band 145. the plastic ribbon 65a has three apertures 68a to clear the three terminal extensions 22a and 34a and is wrapped around and under the flux-concentrating members 24a and the end plates 138 with the two ends 146 of the ribbon extending slightly above the upper edge of the metal band 145.

The base plate 144 has three bores 148 therein to clear the three terminal members 22a and 34a and additionally is provided with counter-sunk bores 150 to retain the upper ends of the two coil terminal members 136. In the construction shown, each of the terminal members 136 has a shank 151 to fit into the corresponding bore 150 and has a peened head 152 for retention in the bore.

The rectangular band 145 may be formed with four upper tongues 154 and four corresponding lower tongues 154, the upper tongues being bent over for engagement with the upper plastic end plates 138 together with adjoining portions of the central plastic body 42a and the lower tongues being bent over for similar engagement with the plastic base plate 144 on the underside of the assembly. Preferably, the central plastic body or core 42a has central recesses or grooves 155 on its opposite sides and the rectangular band 145 is formed with offsets 156 extending into these grooves. These offsets 156 are formed by suitable tools for final tightening of the band.

The described relay may function in much the same manner as heretofore described to control a pair of electrically responsive devices 36 in circuitry connected to the terminal members 22a and 34a in the manner heretofore described. The two coil terminals 136 may be connected to a suitable control circuit for current flow through the coils 134 in one direction to throw the armature 25a against one of the flux-concentrating members 30a and flow in the opposite direction to throw the armature against the other flux-concentrating member.

Figure 11:
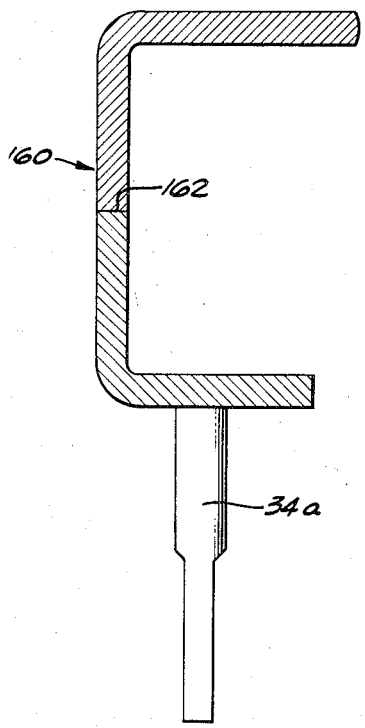
Fig. 11 is a view similar to Fig. 4 showing a flux-concentrating member that may be substituted for one of the flux-concentrating members of Fig. 9 to make the relay uni-stable instead of bi-stable.

The described relay unit is a bi-stable device since the armature 25a will remain in either of its two alternate positions to which it is shifted by energization of the two coils 134. If desired, however, the relay unit may be made uni-stable by substituting the flux-concentrating member 160 shown in Fig. 11 for one of the flux-concentrating members 24a. The flux-concentrating member 160 is of the general construction heretofore described, the upper portion of the flux-concentrating member above the dividing line 162 being made of ferromagnetic material and the portion below the dividing line being made of non-magnetic material such as brass.

Figure 12:
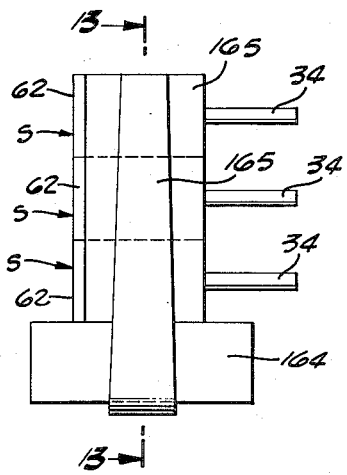
Fig. 12 is a side elevation of a relay incorporating a plurality of switch units such as shown in Fig. 1.
Figure 13:
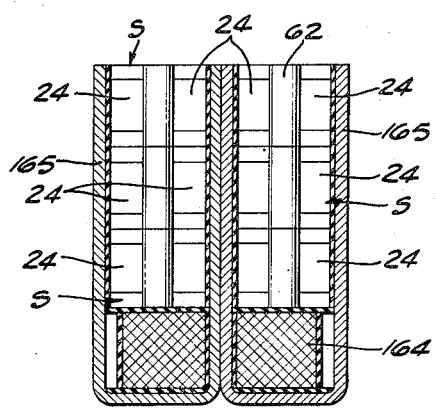
Fig. 13 is a sectional view taken as indicated by the line 13—13 of Fig. 12.
Figure 14:
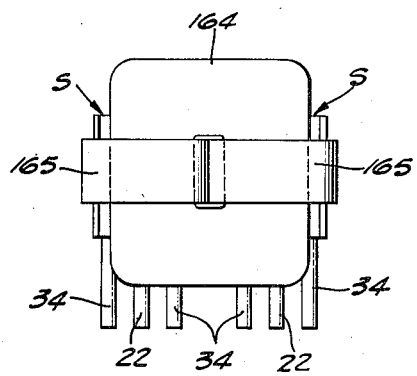
Fig. 14 is a bottom plan view of the same relay.

Figs. 12 to 14 inclusive illustrate how the principles of the invention may be incorporated in a self-contained relay having multiple contactors. The principal part of the relay comprises a coil 164, a pair of U-shaped control-flux concentrators 165 and two bands or rows of switch units S straddled respectively by the two control-flux concentrators. As shown in the drawings, the two control-flux concentrators are positioned in mutual contact with one leg of each member extending through the axial opening of the coil 164 so that each control-flux concentrator straddles a radial portion of the coil.

The switch units S are of the construction heretofore described, each switch unit having the usual pair of flux-concentrating members 24 in contact with the pair of legs of the corresponding control-flux concentrator 165. It is apparent that the coil 164 may be electrically polarized in either direction to cause control flux to be distributed to the various switch units S by the arms of the two control-flux concentrators 165, the armatures of the various switch units swinging between their two limit positions in response to the control flux. Preferably the legs of the two control-flux concentrators 165 are tapered as shown in Fig. 12 to favor uniform distribution of the control flux among the switch units S. The switch units S may be either bi-stable or uni-stable as heretofore described.

Our disclosure herein of selected embodiments of the invention in specific detail will suggest various changes, substitutions and other departures from our disclosure that properly fall within the spirit and scope of the appended claims.

We claim:

1. In a magnetic-flux-responsive switch unit, the combination comprising: a single permanent magnet; two flux-concentrating members positioned on opposite sides of said magnet, extending from one pole thereof to the other, said flux-concentrating members being spaced from said other pole and from each other at said other pole; a linear armature positioned with its inner end adjacent said other pole of said magnet for polarization of the armature by the magnet and with its outer end in said space between the ends of said flux-concentrating members adjacent said other pole to swing between said ends of said flux-concentrating members, said armature being elongated between its ends; and means to produce a field of magnetic flux from one of said ends of one of said flux-concentrating members to the mutually adjacent end of the other of said flux-concentrating members to change the position of said armature.

2. The invention as defined in claim 1, wherein one of said flux-concentrating members is of substantially less extent than the other with respect to the pole-to-pole flux path, whereby said armature seeks the other flux-concentrating member in the absence of superimposed control flux.

3. The invention as defined in claim 2, wherein means are additionally provided to prevent the armature from moving out of the gap between said mutually adjacent ends of said flux-concentrating members.

4. In a multiple-switch assembly, the combination of: a casing comprising a series of casing sections positioned in end-to-end longitudinal alignment; a rotary shaft in said casing positioned longitudinally thereof; a plurality of electromagnetic coils surrounding said shaft; a plurality of transverse means surrounding said shaft and retaining said coils at points spaced longitudinally of the shaft, each of said transverse means engaging said casing for anchorage thereby; a plurality of individual switch units confined by said casing and said transverse means, said switch units being disposed in circumferential and longitudinal rows, with each circumferential row adjacent one of said electromagnetic coils for magnetic operation of the switch units of the circumferential row by the coil; and a plurality of rotary flux concentrators positioned radially on said shaft adjacent said coils respectively to concentrate the flux of the fields of force of the coils at the switch units for operation thereof successively in each circumferential row when the corresponding coils are energized.

5. A multiple switch device as set forth in claim 4 which includes a plurality of stationary flux shorting elements for the fields of force of said coils, said flux shorting elements being positioned between the successive switch units in each circumferential row to cause the flux gathered by each of said rotary flux concentrators to bypass the switch units of the corresponding circumferential row in the course of movement of each flux concentrator from one switch unit to the next successive switch unit.

6. A multiple switch assembly as set forth in claim 5 in which at least some of said flux shorting elements interconnect component parts of the multiple switch device to unify the assembly structure.

7. A multiple switch assembly as set forth in claim 6 in which said unifying flux shorting elements interconnect the two casing sections at the opposite ends of the device.

8. A multiple switch assembly as set forth in claim 7 in which each of said transverse means comprises a pair of members to encase the corresponding coil from opposite sides of the coil and in which at least some of said flux shorting elements interconnect members of said pairs.

9. A multiple switch assembly as set forth in claim 4 in which said transverse means have circumferentially spaced recesses for engagement with said switch units.

10. A multiple switch assembly as set forth in claim 9 in which said casing sections have internal recesses cooperating with said recesses of the transverse means to form pockets confining said switch units.

11. A multiple switch assembly comprising: a plurality of switch units arranged in a row, each having a permanent magnet, a pair of oppositely positioned flux-concentrating members in the field of force of the magnet and an armature at one pole of the magnet polarized thereby and movable laterally with respect to said row to contact said members selectively in response to superimposed controlling magnetic flux; an electric coil to provide controlling magnetic flux; and a pair of control-flux concentrators on opposite sides of said row extending thereto from the opposite polar regions respectively of the magnetic field of said coil to distribute the controlling flux to said units.

12. A combination as set forth in claim 11 in which said control-flux concentrators are progressively reduced in cross-section.

13. A combination as set forth in claim 11 in which said pair of control-flux concentrators are the pair of legs of a U-shaped ferromagnetic member straddling a radial portion of said coil.

14. A combination as set forth in claim 11 in which in at least some of said units one of the flux-concentrating members is of substantially less extent than the other with respect to the pole-to-pole flux path of the permanent magnet whereby the armature of the unit seeks the other flux-concentrating member of the pair in the absence of the control flux.

15. A multiple-switch assembly comprising: a housing; at least one circumferential row of a plurality of magnetic-flux-responsive switch units fixed to said housing, each of said units including a hollow mass of non-conducting material, a pair of flux-concentrating members positioned adjacent the opposite sides of said mass and across one side thereof with a gap between the ends of the two members at one side, a permanent magnet inside said mass with one of its poles exposed at said side, and an armature positioned at said pole for polarization by said magnet and extending into said gap to shift from contact with one of said flux-concentrating members to contact with the other in response to a superimposed controlling magnetic flux; a rotary shaft in said casing positioned longitudinally thereof; at least one electromagnetic coil surrounding said shaft in the axial position of said circumferential row of switch units; and a pair of flux-concentrators positioned radially on said shaft adjacent said coil to concentrate the field of flux of said coil at a selected one of said switch units depending upon the angular position of said shaft.

16. The invention as defined in claim 15 wherein the inner end of each armature and each of said switch units is curved to roll on a corresponding pole surface in response to swinging of the outer end of said armature.

References Cited in the file of this patent

UNITED STATES PATENTS

| | | |
|---|---|---|
| 334,185 | Phelps | Jan. 12, 1886 |
| 2,140,139 | Pratt | Dec. 13, 1938 |
| 2,144,498 | Lenehan et al. | Jan. 17, 1939 |
| 2,253,856 | Harrison | Aug. 26, 1941 |
| 2,277,215 | Ellwood | Mar. 24, 1942 |
| 2,483,658 | Miller | Oct. 4, 1949 |
| 2,732,454 | Buckingham | Jan. 24, 1956 |
| 2,732,458 | Buckingham | Jan. 24, 1956 |
| 2,756,372 | Martindell | July 24, 1956 |

FOREIGN PATENTS

| | | |
|---|---|---|
| 310,054 | Switzerland | Sept. 30, 1955 |